Figure 1:
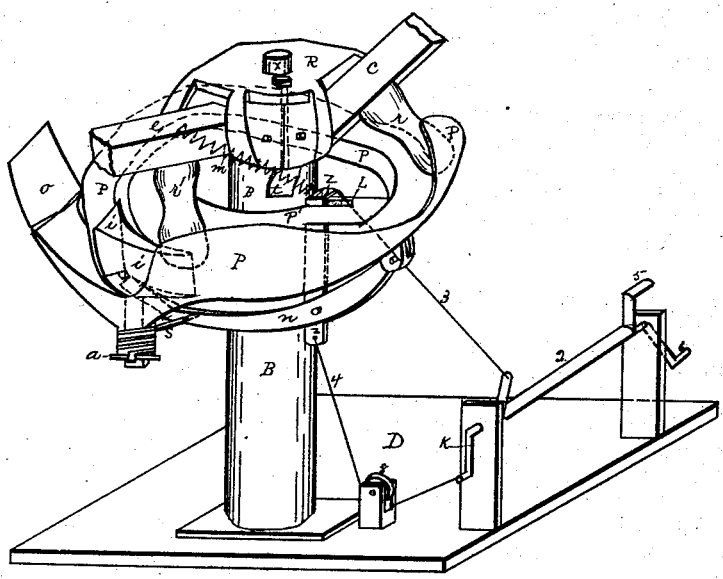

N. CARL.
Harvester-Rakes.

No. 155,924.

Patented Oct. 13, 1874.

UNITED STATES PATENT OFFICE.

NORMAN CARL, OF JOLIET, ILLINOIS.

IMPROVEMENT IN HARVESTER-RAKES.

Specification forming part of Letters Patent No. 155,924, dated October 13, 1874; application filed August 19, 1874.

*To all whom it may concern:*

Be it known that I, NORMAN CARL, of Joliet, in Will county and State of Illinois, have invented certain Improvements in Self-Raking Attachments for Mowers and Reapers, of which the following is a specification:

The nature of my invention consists in so arranging a self-raker that the rakes may be made to rake or not at will by a simple adjustment of parts, the construction and operation of which invention I will proceed to explain, reference being had to the annexed drawings making a part of this specification, in which—

Figure 1 is a perspective view.

Referring to the drawings, P represents the rake-cam, such as has been used heretofore. R represents the rake-head, which receives the rake-arms $c$ and $e$. The rake-head R rests on the upper end of the hollow column B and turns on the rake-column shaft $x$, which passes entirely through the length of the column B. As the rake-head revolves the stop-bolt $t$, attached thereto, is caused to engage with the head or upper end of the upright switch-stop $z$, which passes up through the long slot L in the cam, with the lower end resting in and hinged to the switch-opener $n$, hinged at one end to the lower side of the cam. As the stop-bolt $t$ engages with the switch-opener $n$ by means of and through the medium of the switch-stop $z$, the inner end of the switch-opener $n$ is caused to let loose from the heel of the front rake-switch $i$, which turns on a pinion passing down through the cam P, and terminating in a square end to receive the washer $a$, which engages with a coil-spring, $s$, which spring performs the double office of supporting the inner end of the switch-opener $n$ and operating the front switch $i$. The cam P is so arranged at one side, shown in front in the drawing, so there will be an inner and outer track or groove for the rollers $r\ r'$, attached to and governing the rake-arms $c$ and $e$. When the rollers pass along the inner track or groove then the outer end of the rake-arms are let down low enough to rake the grain from the platform. When they are made to travel in the outer groove or track the arms are lifted high and will not rake. This is all regulated by the switch-stop $z$ and stop-bolt $t$. In its normal condition the rakes will not rake because the front rake-switch $i$ is held by the spring $s$ and switch-opener $n$, so as to shut off the passage of the rollers, and cause them to pass over it in the outer track. In the figure the roller $r'$ is represented as having just passed inside of the front switch, because the stop-bolt $t$ having just engaged with the switch-stop $z$ has caused the switch-opener $n$ to disengage with the heel of the front switch $i$, throwing its longer lip out, so as to allow the roller $r'$ to pass in behind it, which lets the arm $e$ down low enough to rake. As the roller $r'$ passes through it will engage with the rear end or lip of the switch $i$ and set it again, so the next roller will pass outside of it along on the outer track of the cam P, over the back rake-switch $o$, which turns on its pivot as it receives the weight of the roller, so as to make a continuous track for the rollers to roll on, it having been thrown out by the roller just preceeding. As the rake is now arranged with but one stop-bolt $t$, only every other rake will rake. All that is needed to cause every rake to rake will be to add more stop-bolts, or that may be done by means of the foot being placed on the lever 6, which will pull down on the cord 4, which operates the switch-opener $n$, as before stated, and thus every rake can be made to rake, pushing on the crank 6 performing the same office as the stop-bolt $t$. In order to prevent its raking at all the foot may be placed on the crank or lever 5 when the switch-stop $z$ will be pulled forward in the slot L by means of the cord 3 so far that the stop-bolt $t$ will not engage with it, thus causing the rollers to pass round on the outer track, so the rakes will not rake, not coming near enough to the platform for that purpose.

It is in the slot L and in being able to move the switch-stop $z$, so it will not engage with the stop-bolt, that I claim to have made an improvement.

$m$ is a coil-spring in the rear attached to the switch-stop $z$ to bring it back after it has been brought forward in the slot L.

It will be observed that by this simple improvement the operator may cause every arm to rake, may cause two to rake, or may keep any from raking at will while the machine is in motion. This device is intended to be placed on any kind of a reaper or mower platform, and may derive its power by means of gearing or any other convenient manner.

I am aware that other rakes of a very similar construction, with the exception of the movable switch-stop $z$ and slot L, have been used, and, therefore, I make no claim to anything but those features and the mode of operating them.

Having thus described my invention, what I claim as new, and desire to secure by Letters Patent, is as follows:

The combination of the switch-stop $z$, slot L, stop-bolt $t$, coil-spring $m$, cam P, switch-opener $n$, cards or chains 3 and 4, and levers 5, 6, and $k$, arranged, operating, and constructed as and for the purposes set forth.

NORMAN CARL.

Witnesses:
 THOS. HUTCHINS,
 AMOS CRAVER.